United States Patent
Tribuiani

(10) Patent No.: US 6,776,484 B2
(45) Date of Patent: Aug. 17, 2004

(54) PAIR OF SPECTACLES WITH AUTOMATIC BOW OPENING MECHANISM

(75) Inventor: Salvatore Tribuiani, 70, rue du Javelot, 75013 Paris (FR)

(73) Assignee: Salvatore Tribuiani

( * ) Notice: Subject to any disclaimer, the term of this patent is extended or adjusted under 35 U.S.C. 154(b) by 0 days.

(21) Appl. No.: 10/469,266

(22) PCT Filed: Feb. 2, 2002

(86) PCT No.: PCT/FR02/00733

§ 371 (c)(1),
(2), (4) Date: Aug. 27, 2003

(87) PCT Pub. No.: WO02/071129

PCT Pub. Date: Sep. 12, 2002

(65) Prior Publication Data

US 2004/0075806 A1 Apr. 22, 2004

(30) Foreign Application Priority Data

Mar. 5, 2001 (FR) .......................................... 01 02956
Mar. 23, 2001 (FR) .......................................... 01 03913
Apr. 9, 2001 (FR) .......................................... 01 04773

(51) Int. Cl.$^7$ ............................................. G02C 5/22
(52) U.S. Cl. ............................. 351/153; 153/63; 16/228
(58) Field of Search ........................... 351/63, 121, 153; 16/228

(56) References Cited

U.S. PATENT DOCUMENTS

| 4,932,771 A | * | 6/1990 | Nowottny | 351/153 |
| 6,099,117 A | * | 8/2000 | Gregory | 351/49 |
| 6,139,143 A | | 10/2000 | Brune et al. | 351/153 |
| 6,679,604 B1 | * | 1/2004 | Bove et al. | 351/153 |

FOREIGN PATENT DOCUMENTS

| WO | WO/97/03379 | 1/1997 | ............ G02C/5/22 |
| WO | WO/97/22035 | 6/1997 | ............ G02C/5/22 |

* cited by examiner

Primary Examiner—Huy Mai
(74) Attorney, Agent, or Firm—Renner, Kenner, Greive, Bobak, Taylor & Weber

(57) ABSTRACT

The invention concerns a pair of spectacles comprising a frame (1) whereon is mounted rotatable at least a first end (6) of a first bow (2). The frame (1) comprises control means (8) for locking the first end (6) in a first position wherein the first bow (2) is placed substantially against the frame and, when actuated, for releasing the first bow (6) so that it automatically takes up a second position wherein the first bow (2) and the frame (1) define an angle of predetermined non-nul value.

10 Claims, 5 Drawing Sheets

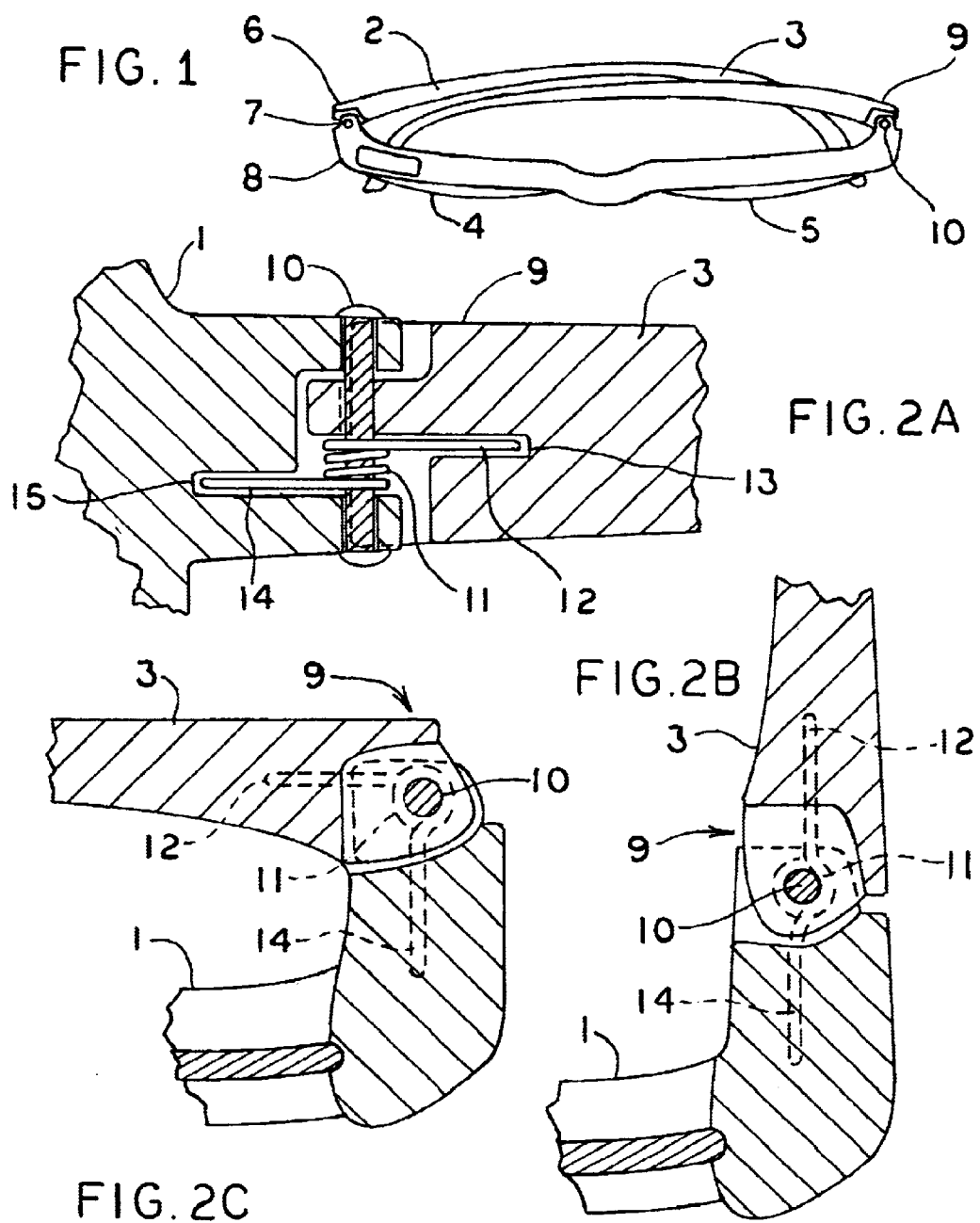

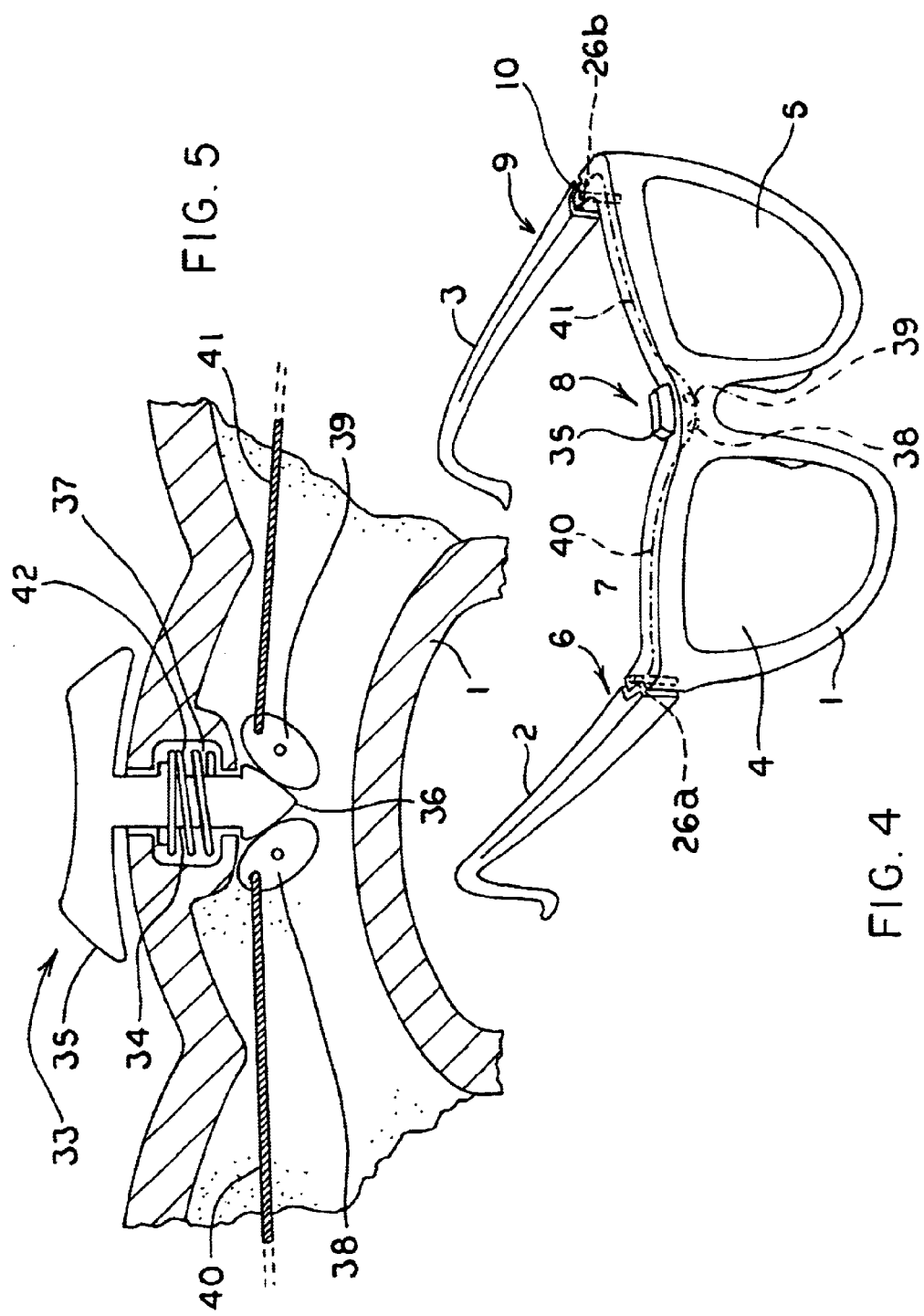

PAIR OF SPECTACLES WITH AUTOMATIC BOW OPENING MECHANISM

TECHNICAL FIELD AND BACKGROUND

The invention relates to the area of pairs of spectacles and more precisely control of the position of the sides with respect to the frames.

Numerous mechanisms have been proposed to provide automatic folding back of the sides of spectacles. On the other hand, there is no simple and reliable mechanism to provide for automatic opening of the sides.

DISCLOSURE OF THE INVENTION

The object of the invention therefore is to provide an original solution to the problem of opening the sides of spectacles.

To this end, it proposes a pair of spectacles formed particularly by a frame on which the first end of at least one side, and preferably two sides, is mounted for rotation, and which comprises control means adapted on the one hand to immobilise the first end of the first side in a first position in which the said first side is disposed substantially against the frame and, on the other hand, in the event of actuation, to release the first end of the first side so that it automatically assumes a second position in which the first side and the frame define an angle of a predetermined value other than zero (typically of the order of about 90°).

Thus by actuating the control means at least one of the first ends of the sides can rotate and the said sides can automatically move away from the frame.

The control means could be in various forms, whether controlling directly or indirectly the opening of one or two sides (second position) and, of course, their immobilisation in the closed position (or first position). More precisely, the pair of spectacles may have the following characteristics taken separately or in combination:

- a first side mounted for rotation on the frame by means of a pivot provided with first return means which are stressed when the first end is in its first position;
- control means comprising i) a first immobilisation means which can assume a locking position enabling it to cooperate with the pivot to hold the first end in its first position, and ii) an actuating means which can act on the first immobilisation means so that it assumes a release position preventing it from cooperating with the pivot;
- an actuating means comprising second return means which can be stressed in the event of actuation of the control means;
- control means comprising not only the first immobilisation means but also a second immobilisation means adapted to assume a locking position enabling it to co-operate with the pivot to hold the first end of the second side in its first position, the actuating means then being adapted, in the event of actuation, to act on the second immobilisation means so that it assumes a release position preventing it from co-operating with the pivot, thus releasing the first end of the second side and enabling it automatically to assume its second position;
- a first end of a second side which, instead of being controlled by the control means, is kept immobilised in its first position simply by the fact that the first end of the first side is itself immobilised in its first position. In that case; opening of the second side is automatically initiated by its return means;
- one (or two) immobilisation means connected to the actuation means by a cable and provided with third return means adapted to be stressed in the event of actuation of the control means. In this case, the cable or cables is housed in one or more passages formed in the frame or said cable or cables are disposed outside said frame;
- one or more immobilisation means comprising a rigid end adapted to move substantially in translation, and one or more pivots comprising a stop adapted to co-operate with the rigid end to immobilise each first end in its first position;
- one or more immobilisation means comprising a rigid end adapted to move substantially in translation, and one or more pivots comprising a recess adapted to receive at least a part of the rigid end to immobilise each first end in its first position;
- an actuation means comprising i) a drive means for each immobilisation means, each drive means being connected to the corresponding cable and adapted to pull the cable in the event of being driven in rotation relatively to the frame to cause translation of the rigid end of the corresponding immobilisation means, and ii) a push member capable, in the case of actuation by pressure, of driving each drive means in rotation so that the first end of the corresponding side can pass automatically from its first position to its second position;
- an actuation means mounted for rotation relatively to the frame and comprising two opposite parts, the first part being connected to each cable so that in the event of actuation of the second part the first part exerts a traction on each cable thus causing the rigid end of the corresponding immobilisation means to move in translation and the first end of the corresponding side to pass automatically from its first position to its second position;
- an actuation means in the form of an element mounted for rotation relatively to the frame and arranged so as to pull each cable, in the event of actuation by rotation, to cause translation of the rigid end of each immobilisation means so that each first side end can pass automatically from its first position to its second position.

BRIEF DESCRIPTION OF THE DRAWINGS

Other characteristics and advantages of the invention will be apparent from the following detailed description and the accompanying drawings wherein:

FIG. 1 is a top plan view of a pair of spectacles provided with a first opening/closing mechanism according to the invention.

FIGS. 2A to 2C illustrate the return means for the second side in FIG. 1 in cross-sectional views respectively vertical (2A—side open), horizontal (2B—side open) and horizontal (2C—side closed).

FIG. 4 is a perspective view of a pair of spectacles equipped with a second opening/closing mechanism according to the invention.

FIG. 5 is a vertical cross-section showing in detail and diagrammatically the second opening/closing mechanism of FIG. 4.

PREFERRED EMBODIMENT FOR CARRYING OUT THE INVENTION

Figure 3A:
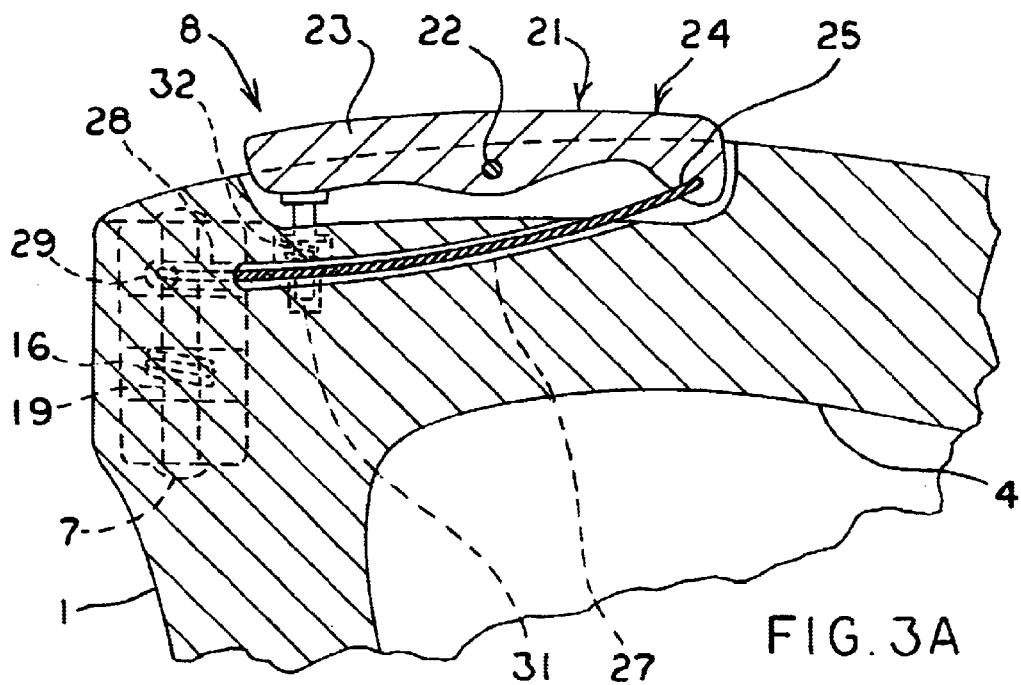
FIGS. 3A to 3D illustrate the return means for the first side and the first opening/closing mechanism in cross—sectional views respectively vertical (3A), horizontal (3B—side closed), horizontal (3C—side open) and vertical lateral (3D—side open).

The accompanying drawings are mainly of a specific character so that they can serve not only to complete the invention but also contribute to its definition, where applicable.

In the following description, reference will be made to a pair of spectacles comprising a frame 1 on which two sides 2, 3 are rotatably mounted, the frame supporting two lenses 4, 5. However, the pair of spectacles could comprise just a frame coupled to a single side.

As shown in FIG. 1, the first side comprises a first end 6 fixedly connected to a first pivot 7 mounted for rotation on the frame 1, and a second free end. In this first exemplified embodiment, only the position of the first side 2 is directly controlled by the control means 8 of the opening/closing mechanism.

The second side 3 also comprises a first end 9 fixedly connected to a second pivot 10 mounted for rotation on the frame 1, and a second free end. As will be clearer from FIGS. 2A to 2C, the second pivot 10 supports a return means which in this case is in the form of a spiral spring 11, of which a first end 12 is immobilised in a recess 13 formed in the first end 9 of the second side 3, while a second end 14 remote from the first end 12, is immobilised in a recess 15 formed in the frame 1. The spring 11 is stressed when the second side 3 is folded back against the frame 1 (see FIG. 2C). Consequently, in this embodiment, the first end 9 of the second side 3 is in a first (unstable) position when the second side is folded back and in a second (stable) position when the second side 3 and the frame define an angle, in this case substantially equal to 90°.

As will be apparent hereinafter, the second side 3 is therefore held in its folded position when the first side 2 is immobilised in the folded position, above it, by the opening/closing mechanism.

Reference will now be made to FIGS. 3A to 3D to describe the opening/closing mechanism of the first side 2.

The first pivot 7 of the first side 2 supports a return means which in this case is in the form of a spiral spring 16 of which a first end 17 is immobilised in a recess 18 formed in the first end 6, while a second end 19 remote from the first 17 is immobilised in a recess 20 formed in the frame 1. The spring 16 is stressed when the first side 2 is folded back against the frame 1 (see FIG. 3B). Consequently, in this embodiment, the first end 6 of the first side 2 is in a first position (unstable without the mechanism—FIG. 3B) when the first side is folded back and in a second position (stable—FIGS. 3C and 3D) when the first side 2 and the frame 1 define an angle, in this case substantially equal to 90°.

The opening/closing mechanism (or control means 8) in the example illustrated in FIGS. 3A to 3D comprises an actuating member 21 mounted for rotation relatively to the frame 1 by means of a pivot 22 and comprising a first part 23 connected to a drive means, which in this case is in the form of a cable 25, and a second part 24 intended for actuation by a user.

The end of the cable remote from the first part 23 terminates in an immobilisation means, which in this case is in the form of a tapering point 26 which leads to the vicinity of the first pivot 7 of the first side 2. In the example illustrated, the cable 25 is housed in a passage 27 formed in the frame 1 and opening out, at one end, facing the first part 23 and, at the other end, at the first end 6 of the first side 2.

Figure 3B:
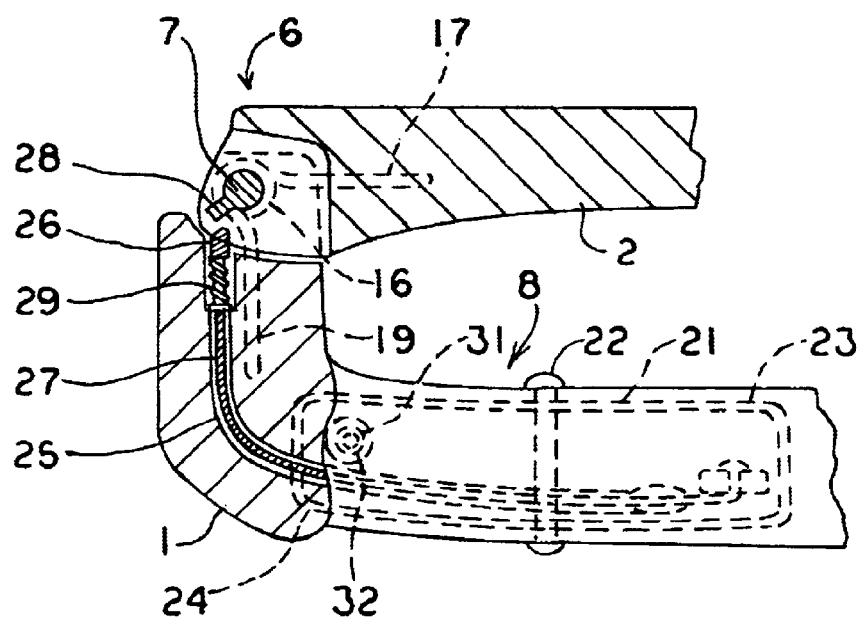
Figure 3C:
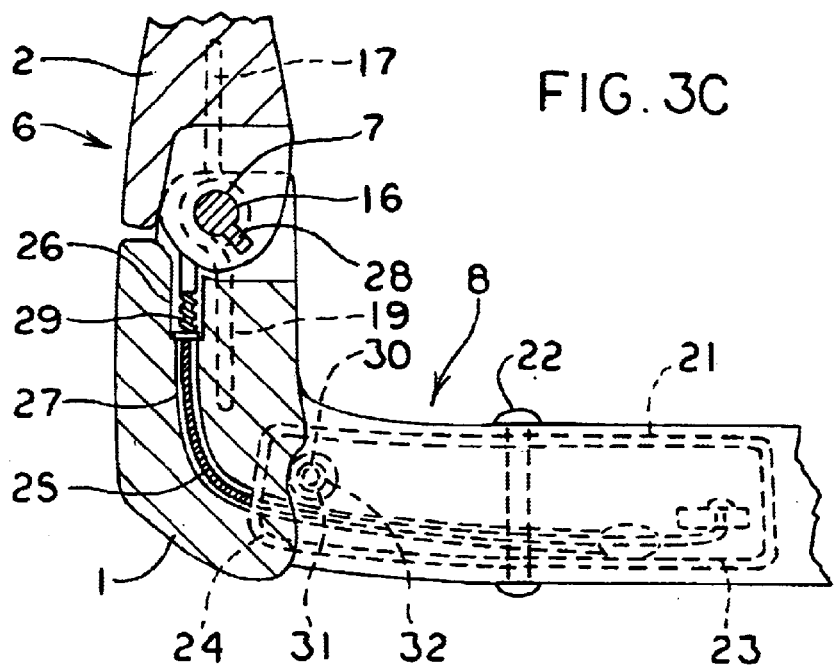
Figure 3D:
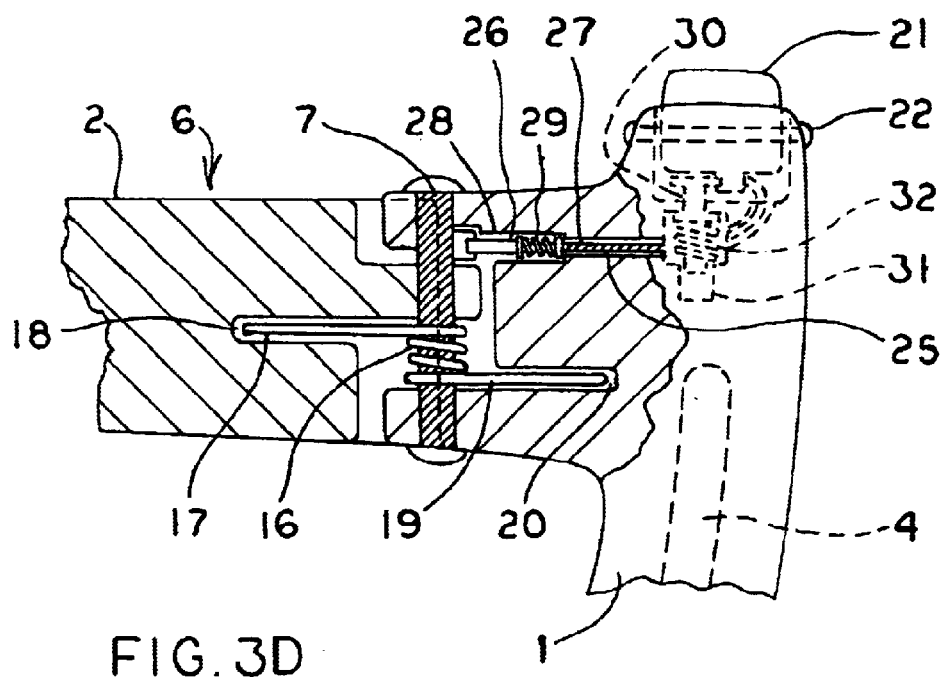

In the example illustrated, the first pivot 7 comprises a radial stop 28 intended to co-operate with the tapering point 26 to immobilise the first end 6 in its first position (see FIG. 3B). In this first position (side folded back) the first end 6 cannot be driven in rotation, even if the spring 16 is stressed, because the stop 28 is blocked by the point 26. The rotary drive is therefore possible only if the point 26 is withdrawn.

This withdrawal is effected by actuating the second part 24, by pressure in this case, of the actuating means 21. In fact, this actuation causes the first part 23 of the actuating means 21 to exert a pull on the cable 25, thus causing the point 26 to be withdrawn by a translatory movement so that the first end 6 of the first side 2 passes automatically from its first position to its second position.

To enable the point 26 to return to its locking position (FIG. 3B), a return means is preferably provided, in this case in the form of a spiral spring 29 disposed just upstream of the said point. Also, to facilitate return of the actuating means 21 to its initial position (before actuation), a stop 30 is preferably provided beneath the second part 24, at least partially situated in a recess 31 in the frame 1, and supporting in an intermediate part a return means which in this case is in the form of a spiral spring 32. A pressure exerted on the second part 24 causes the stop 30 to be moved in translation, and compression of the spring 31. Consequently, when the user stops exerting a pressure on the second part 24, the spring 31 forces the said second part 24 to move in translation and restore the actuating means 21 to its original position.

When the user wishes to put his pair of spectacles away, he must first fold back the second side 3, and then fold back the first side 2. When the stop 28 reaches the level of the point 26, the pressure exerted by the user on the first side 2 is sufficient to overcome the pressure exerted by the spring 29 so that the point 26 withdraws, allows the stop 28 to pass, and then is repositioned in its position of rest, immobilising the first end 6 in its first position. The second side 3 is then also immobilised in its folded back position because The first side 2 is immobilised against and above it.

According to another embodiment comprising fewer components, the stop 28 may be replaced by a cavity in the body of the pivot 7, the point 26 co-operating therewith for an equivalent result.

Reference will now be made to FIGS. 4 and 5 to describe a second embodiment of the opening/closing mechanism according to the invention.

This second mechanism is intended here to control the positions of the two sides directly and substantially simultaneously. It could, however, be used to control just a single side.

The immobilisation means, the return means and the pivots (stop type) used in this second embodiment are preferably identical to those used in the first mechanism to control the first side. Consequently, these means will not be described again and have identical references but combined with the letters "a" or "b" depending on whether they concern the first side 2 or the second side 3.

In this case, only the embodiment of the actuating means differs from that of the first mechanism. It comprises a push button 33 formed by a central rod 34 extended on one side by an actuating head 35 and on the other side by a foot 36 having inclined surfaces, This foot could also be of inverted pyramidal or frusto-conical shape. The central rod 34 and the foot 36 are housed in a recess 37 formed in this case in the central part (the bridge) of the frame 1. The recess could however be off-centre.

In addition, the central rod 34 is provided with a return means, in this case in the form of a spiral spring 42. Thus when pressure is applied to the head 35 of the actuating means 33 it compresses the spring 42 so that relaxation of the pressure enables said actuating means 33 to resume its initial position.

The surfaces of the foot 36 are disposed opposite two drive means 38, 39 mounted for rotation relatively to the frame 1 and in this case provided in the form of preferably asymmetrical rollers. Each roller 38, 39 is connected to the end of a cable 40, 41 of which the other end is connected to an immobilisation means, for example a tapering point (or rod) 26a, 26b, of the type shown in FIGS. 1 to 3.

Actuation of the head 35 of the push button 33 initiates translatory movement of the foot 36, the inclined surfaces of which will drive the rollers 38, 39 in rotation. Rotation of the rollers exerts a traction on the cables 40 and 41 and hence on the points 26a and 26b disposed at their ends. The rotation of the pivots 7 and 10 (under the stress of the springs 29) is then released and the first ends 6 and 9 can pass successively from their first position to their second position. The two sides 2 and 3 are then automatically disposed at about 90° to the frame 1.

To fold back the sides, all that is required is to apply thereto a sufficient pressure for the stops 28 of the pivots 7 and 10 to be able to overcome the pressure exerted by the springs 29 on the points 26a and 26b, and for the said stops then to pass beyond said points. The points 26a and 26b can then resume their initial position, thus immobilising the stops 28.

The invention is not limited to the embodiments described hereinbefore solely by way of example, but covers all variants that the skilled man may consider within the scope of the following claims.

Thus a mechanism has been described in which immobilisation of the first side end is effected by co-operation of a point (or tapering rod) and a stop borne by the side pivot. However, immobilisation can also be obtained by co-operation of a recess formed in the pivot and a possibly tapering rod.

Also, return means other than spiral springs can be used.

In addition, the opening/closing mechanism illustrated in FIGS. 1 to 3 could be adapted to control the positions of the two sides directly. To this end, for example, all that is required is to provide means for immobilising the first end of the second side, of the type used for the first side, and connecting said immobilisation means either to the first part of the actuating means (which if required could be moved to the central position on the frame bridge) or to a specific actuating means.

Similarly, a mechanism illustrated in FIGS. 4 and 5 could be used directly to control just a single side. In that case, only one drive disc would be required, and the actuating means could if required be situated off-centre near the first end of the side concerned.

Also, the cables could be disposed at the surface of the frame rather than inside ducts or recesses formed in the frame.

An actuating mechanism operating by rotation rather than by pressure could also be considered. For example, all that would be required would be to use a rotary member with an elastic return, provided with a radial disc to which one or two (diametrically opposite) cables would be attached.

Finally, drive means other than cables could be used. The cables could in fact be replaced by an incompressible fluid held in a duct terminating in two sealing-tight membranes, one controlled by the actuating means and the other controlling an immobilisation means.

Figure 6:
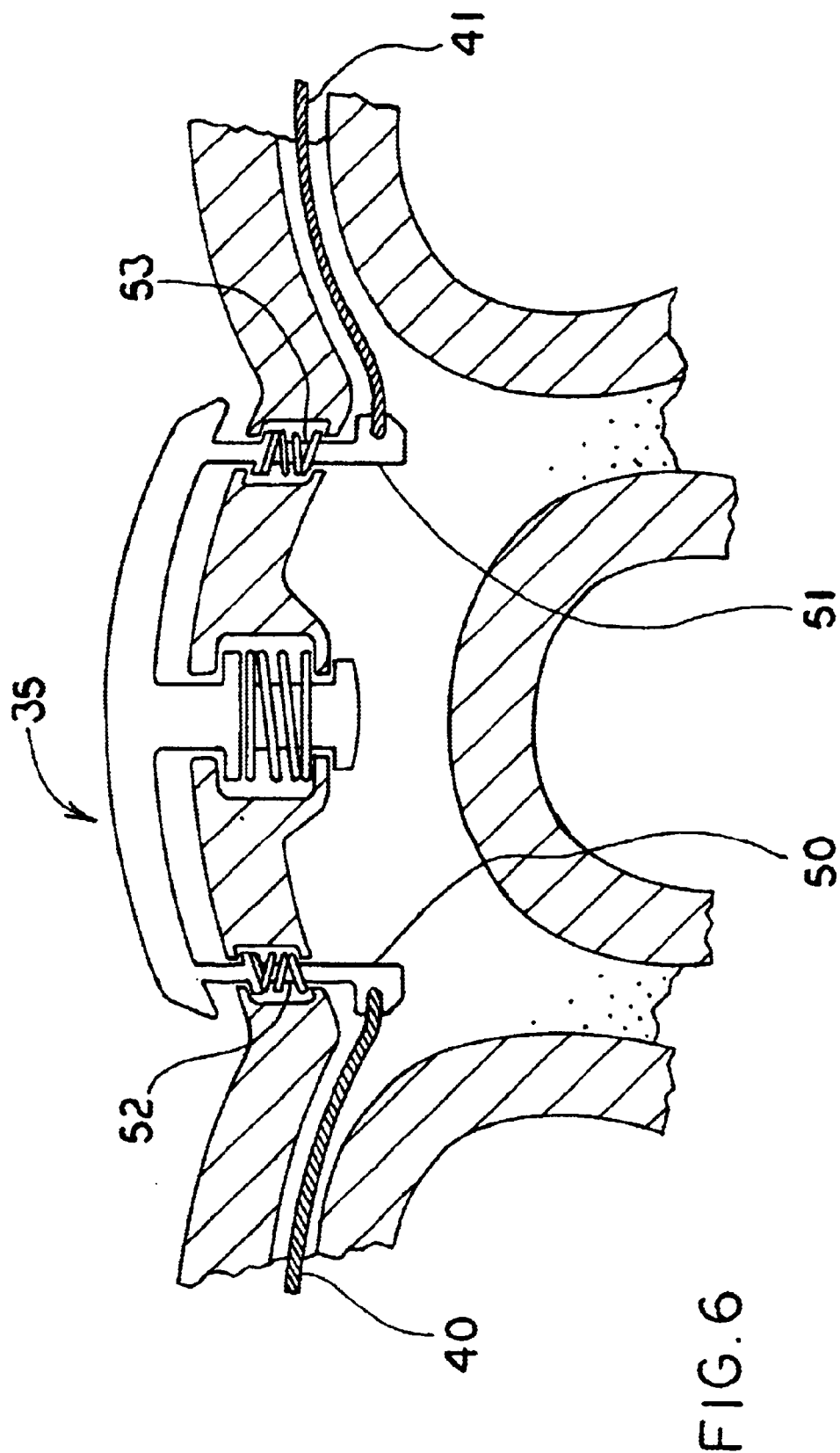
FIG. 6 describes another embodiment of a pair of spectacles according to the invention.

In FIG. 6, the push button 35 is connected to each of the cables 40, 41 by a respective rod 50, 51 extending from the push button 35. Two springs 52, 53 are mounted along the rods 50, 51 to bias the push button upwards, in balanced manner. When the push button 36 is pushed, the rods 50, 51 connecting the push button to the cables pull the latter downwards, releasing at the other end of the cables the stops 28 with respect to the points 26.

Of course the features of the various embodiments described can be combined with one another in any number whatsoever to obtain other embodiments, which are obviously covered by this invention.

What is claimed is:

1. A pair of spectacles comprising a frame (1) on which at least one first end (6) of a first side (2) is mounted for rotation, characterised in that the said frame (1) comprises control means (8) adapted, on the one hand, to immobilise the said first end (6) in a first position in which the first side (2) is disposed substantially against the said frame and, on the other hand, to release the said first end (6) so that it automatically assumes a second position in which the said first side (2) and the said frame (1) define an angle of a predetermined value other than zero.

2. A pair of spectacles according to claim 1, characterised in that the first side (2) is mounted for rotation on the frame (1) by means of a pivot (7) provided with first return means (16) which are stressed when the said first end (6) is in its first position.

3. A pair of spectacles according to claim 2, characterised in that the said control means (8) comprise a first immobilisation means (26; 26a) adapted to assume a locking position in which it co-operates with the said pivot (7) to hold the said first end (6) in its first position, and an actuating means (21; 33) adapted to act on the said first immobilisation means (26; 26a) to assume a release position in which it no longer co-operates with said pivot (7).

4. A pair of spectacles according to claim 3, characterised in that the said actuating means (21; 33) comprises second return means (32; 42) adapted to be stressed in the event of actuation of the said control means.

5. A pair of spectacles according to claim 1, characterised in that it comprises a second side (3) provided with a first end (9) mounted for rotation on the said frame (1) by means of a pivot (10) provided with third return means (11) adapted to be stressed when the said first end (9) is in a first position in which the second side (3) is disposed substantially against the said frame (1).

6. A pair of spectacles according to claim 5, characterised in that the control means (8) comprise a second immobilisation means (26b) adapted to assume a locking position in which it co-operates with the said pivot (10) to hold the said first end (9) in its first position, and in that the said actuating means (33) is adapted, in the event of actuation, to act on the said second immobilisation means (26b) so that it assumes a release position in which it no longer co-operates with the said pivot (10) and releases the said end (9) of the second side (3) so that it automatically assumes a second position in which the said second sides (3) and the said frame (1) defined an angle of predetermined value other than zero.

7. A pair of spectacles according to claim 6, characterised in that each immobilisation means (26; 26a, b) is connected to the actuating means (21; 33) by a cable (25; 40, 41) and is provided with fourth return means (29; 29a, b) adapted to be stressed in the event of actuation of the said control means.

8. A pair of spectacles according to claim 7, characterised in that each cable (25; 40, 41) is housed in a passage (27; 42a, b) formed in the said frame (1).

9. A pair of spectacles according to claim 7, characterised in that each cable (26; 40, 41) is disposed outside the frame (1).

10. A pair of spectacles according to claim 5, characterised in that the said first end (9) of the second side (3) is immobilised in its first position when the first end (6) of the first side (2) is immobilised in its first position.

* * * * *